Nov. 16, 1965  L. S. JAWORSKI  3,217,586

THREADED SLEEVE INCLUDING AN EDGE ABUTMENT RETAINING MEANS

Filed April 19, 1963

INVENTOR.
LEONARD S. JAWORSKI
BY
*Malcolm W. Fraser*
ATTORNEY

3,217,586
THREADED SLEEVE INCLUDING AN EDGE ABUTMENT RETAINING MEANS

Leonard S. Jaworski, Toledo, Ohio, assignor, by mesne assignments, to The Bishop and Babcock Corporation, Toledo, Ohio, a corporation of Ohio
Filed Apr. 19, 1963, Ser. No. 274,108
1 Claim. (Cl. 85—83)

This invention relates to fastening devices and an object is to produce a new and improved fastener for securely and reliably connecting a screw threaded bolt to a plastic-like member of the type which ordinarily cannot hold or retain the bolt when subjected to sizeable torsional stresses or to repeated applications of the bolt. The objective of the invention may be achieved by a fastening device for connecting a metallic screw-threaded bolt to a part having a plastic-like impressible bolt-receiving cylindrical cavity comprising a longitudinally split spring metal sleeve having a plain walled outer section for fitting the walls of the cavity and an internally and externally screw-threaded outer section adapted when positioned in the cavity to be of less diameter than that of the bolt intended therefor, whereby upon application of the bolt the outer section is forced outwardly to embed and impress the external screw threads thereof into the walls of the cavity thereby to militate against loosening of the bolt.

Figure 1:
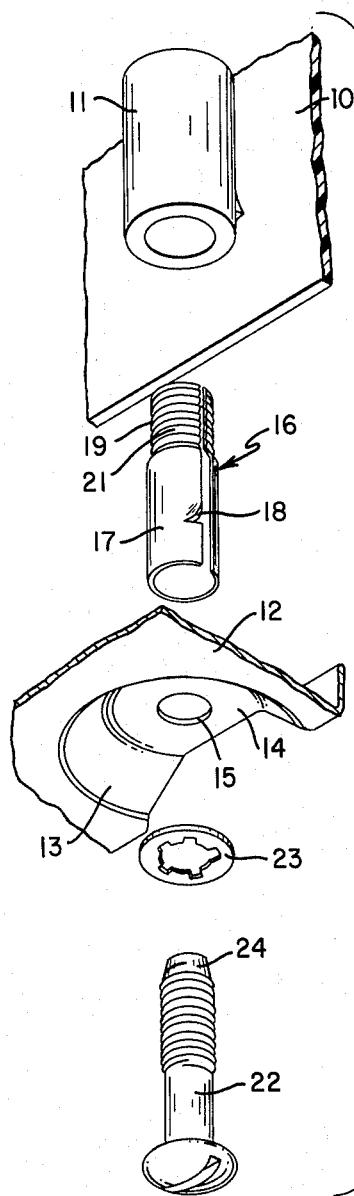
Figure 2:
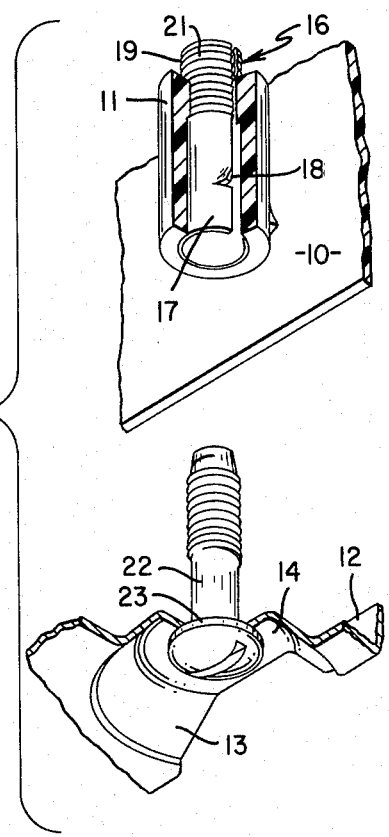
Figure 3:
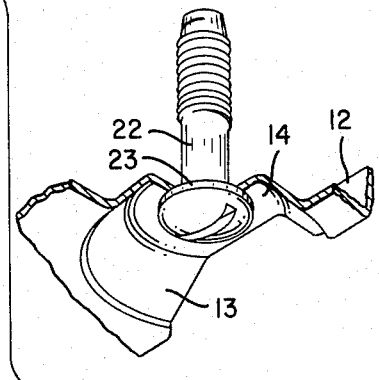
Figure 3:
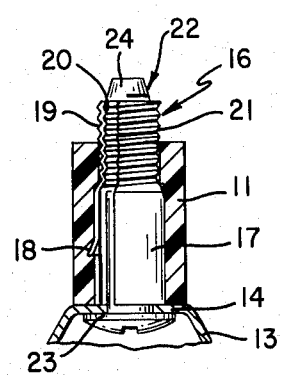

Other objects and advantages of the invention will hereinafter appear and, for purposes of illustration but not of limitation, an embodiment of the invention is shown on the accompanying drawings, in which FIGURE 1 is a composite perspective view of the parts which make up the fastener assembly, showing in fragment a plastic cover for a telephone instrument and also the sheet metal frame for such instrument which are to be connected together;

FIGURE 2 is a composite perspective view of the parts shown in FIGURE 1 but in which the split sleeve is applied to the cavity or cylinder formed on the plastic cover and also showing the screw applied to the frame member preparatory to being connected to the sleeve carried by the cover of the telephone instrument; and FIGURE 3 is a fragmentary vertical sectional view showing the parts in their connected relation.

The illustrated embodiment of the invention comprises a plastic cover 10 for a telephone instrument. On the inner wall of the cover 10 is shown an integrally connected open-ended plastic tube 11. It will be understood that the cover is equipped with several of these tubes 11 in order to effect the proper balanced connection between the instrument frame and the cover. The particular plastic employed for the cover forms no part of the invention except that it must be of the material which ordinarily will not securely retain a screw-threaded bolt when the latter is subjected to torsional stresses or when the bolt is repeatedly applied. Many different plastics may be used in this connection and as a matter of fact instead of plastic, wood may be employed since it has the characteristics as above mentioned.

12 designates a sheet metal frame for the telephone instrument and it is desired to connect the sheet metal frame 12 to the plastic cover so that the parts will be securely and reliably connected together. As shown, the frame 12 is formed with a tapered circular countersunk portion 13 and this portion has a flat end wall 14 formed with a central hole 15. Manifestly this enables the frame of the telephone to fit flatly against the supporting surface and makes possible the concealment of the head of the bolt employed for connecting the parts together.

A longitudinally split spring metal clip or sleeve 16 is employed for mounting inside of the tube 11 on the instrument cover. As shown, the clip 16 is formed with a relatively long plain wall section 17 which is adapted, when expanded, to fit snugly the wall of the tube 11. The clip normally is of somewhat greater diameter than that of the tube 11 so that upon applying it, the clip is constricted somewhat to position it within the hole in the tube 11. At the free edge of the plain wall section 17 is an outwardly and downwardly inclined barb or detent 18 which, when the clip is mounted within the tube 11, impinges against the plastic wall and resists retrograde movement of the clip as well as to resist turning movement of the clip when in position of use. As shown, the detent 18 is disposed approximately centrally of the plain wall section 17. It will be observed that the sleeve 16 defines a generally cylindrical envelope which is split from end to end and has its edges spaced from one another. The detent 18 provides an abutment which in effect extends radially outward of the envelope of the sleeve 16.

The upper integral section 19 of the clip is somewhat shorter than the plain wall section 17 and is provided with internal screw threads 20 and external screw threads 21, which may be rolled on the metal clip as will be readily understood by those skilled in this art. The upper section 19 is of slightly less diameter than that of the plain wall section and when the clip is applied to the cylinder 11 a sufficient area of the external threads, as well as the internal threads, must be available for engagement in order securely to retain the clip within the tube 11 by a spreading action.

A headed screw 22 having a lock washer 23 is inserted through the hole 15 in the frame 12 and then is extended into the clip 16. As shown the bolt is formed with a tapered nose 24 to act as a lead in expanding the smaller diametered upper section 19 so that the threads of the bolt can engage the internal threads 20 of the section 19. When this takes place the upper section 19 is expanded sufficiently to cause the external threads 21 to embed or impress themselves into the material of the plastic tube 11. By such intimate engagement, the clip 16 is securely retained in place and a satisfactory and reliable connection is effected between the bolt and the plastic tube 11. The connection is such that the bolt can be repeatedly unscrewed and applied without liability of the parts coming loose.

From the above description it will be manifest that I have produced an exceedingly simple but extremely effective device for connecting a screw-threaded bolt to a plastic-like part, enabling substantial torsional stresses to be effected without damage and also making possible repeated applications and tightening of the screw as is required.

Numerous changes in details of construction, arrangement and choice of materials may be effected without departing from the spirit of the invention as defined by the claim.

What I claim is:

A fastening device of the character described, comprising a plastic-like impressible bolt-receiving cylindrical cavity, a spring metal cylindrical sleeve defining a generally cylindrical envelope split from end to end with the edges spaced apart and having a plain walled outer section of an outer diameter for fitting the walls of said cavity and an internally and externally screw threaded section integral with and extending from one end of the plain walled outer section adapted when positioned in said cavity to be of less diameter than that of the bolt intended therefor, the threads of said screw threaded section being rolled threads, the internal diameter of said outer section exceeding the major diameter of the internal threads of said screw threaded section, said plain walled outer section of said sleeve being normally of greater diameter than that of said cavity and being first constricted to enter said cavity after which it expands into intimate engagement with the walls thereof, said screw threaded section being of substantially less diameter than that of said cavity in order freely to enter same, and detent means constituting an irregular edge portion of said sleeve providing an abutment which is located radially outwardly of the envelope of said cylindrical sleeve, said detent means impinging upon the wall of said cavity for retaining said sleeve in place preparatory to receiving the bolt.

References Cited by the Examiner

UNITED STATES PATENTS

| | | | |
|---|---|---|---|
| 1,434,806 | 11/1922 | Brown | 85—85 |
| 1,611,942 | 12/1926 | Persons | 85—85 |
| 2,240,425 | 4/1941 | Sternbergh | 85—84 |
| 2,314,770 | 3/1943 | Cogswell | 248—235 |
| 3,027,670 | 4/1962 | Kramer et al. | |

FOREIGN PATENTS 241,045   10/1925   Great Britain.

EDWARD C. ALLEN, *Primary Examiner.*